US012798646B2

(12) United States Patent
Chestnut

(10) Patent No.: US 12,798,646 B2
(45) Date of Patent: Nov. 17, 2026

(54) PALLET JACK WITH LATERALLY SPREADING AND TELESCOPICALLY EXTENDING PRONGS

(71) Applicant: Charles Chestnut, Madison, TN (US)

(72) Inventor: Charles Chestnut, Madison, TN (US)

( * ) Notice: Subject to any disclaimer, the term of this patent is extended or adjusted under 35 U.S.C. 154(b) by 272 days.

(21) Appl. No.: 18/619,440

(22) Filed: Mar. 28, 2024

(65) Prior Publication Data

US 2025/0304133 A1 Oct. 2, 2025

(51) Int. Cl.
*B62B 3/06* (2006.01)

(52) U.S. Cl.
CPC .......... *B62B 3/0612* (2013.01); *B62B 3/0618* (2013.01); *B62B 2203/24* (2013.01); *B62B 2206/04* (2013.01)

(58) Field of Classification Search
CPC ....... B62B 3/06; B62B 3/0615; B62B 3/0618; B62B 3/0625; B62B 2203/24; B62B 2206/04; B66F 9/122; B66F 9/14; B66F 9/143; B66F 9/144
See application file for complete search history.

(56) References Cited

U.S. PATENT DOCUMENTS 4,938,652 A * 7/1990 Sanderson .............. B66F 9/122 414/667
5,190,436 A 3/1993 Sorlie
7,114,906 B1 * 10/2006 Baumgamer ......... B62B 3/0618 280/43.12
7,641,011 B2 * 1/2010 Fridlington, Jr. ..... B62B 3/0618 180/68.5
7,976,032 B1 * 7/2011 Dockins ................ B62B 3/0618 187/229
8,336,654 B1 * 12/2012 Licon .................. B60K 7/0007 280/43.12
8,979,099 B1 3/2015 Ellis
9,745,180 B2 8/2017 Meijer
10,946,884 B2 * 3/2021 Simpson ................. B66F 9/065
10,988,155 B2 * 4/2021 Kalinowski ............... B66F 9/12
11,964,859 B2 * 4/2024 Meijer ...................... B66F 9/20
2007/0116548 A1 * 5/2007 Cooper ................... B66F 9/142 414/619
(Continued)

FOREIGN PATENT DOCUMENTS

CN 207759985 U * 8/2018
CN 111422791 A * 7/2020 ................ B66F 9/12
(Continued)

OTHER PUBLICATIONS

Machine translation of CN 207759985 U obtained on Feb. 20, 2026.*

*Primary Examiner* — Adam D Rogers

(57) ABSTRACT

A pallet jack for adapting to different pallets includes a frame and a steer wheel rotatably coupled to the frame. A frame jack is mounted between the steer wheel and the frame, and the frame jack is alternately extendable and retractable to raise and lower the frame respectively relative to the steer wheel. A pair of prongs is mounted to the frame. Each prong is elongated and extends forwardly from the frame. The prongs lie parallel to each other and are spaced laterally from each other with respect to the frame. Each prong is slidable laterally with respect to the frame and is alternately telescopically extendable away from and retractable toward the frame.

12 Claims, 8 Drawing Sheets

(56) References Cited

U.S. PATENT DOCUMENTS

| | | | | |
|---|---|---|---|---|
| 2009/0189132 | A1* | 7/2009 | Meijer | B62B 3/06 254/2 R |
| 2009/0314582 | A1* | 12/2009 | Meijer | B66F 9/122 187/237 |
| 2022/0281729 | A1* | 9/2022 | Tsuruta | B66F 9/122 |

FOREIGN PATENT DOCUMENTS

| | | | | | |
|---|---|---|---|---|---|
| CN | 112607669 | A | * | 4/2021 | B66F 9/20 |
| CN | 113979358 | A | * | 1/2022 | B66F 9/06 |
| CN | 117430060 | A | * | 1/2024 | B66F 9/18 |
| DE | 2410463 | A1 | * | 10/1974 | |
| DE | 10216482 | | | 11/2003 | |
| DE | 102007062623 | A1 | * | 6/2009 | B66F 9/143 |
| EP | 1935750 | A2 | * | 6/2008 | B62B 3/0625 |
| EP | 2508462 | | | 10/2012 | |
| GB | 729461 | A | * | 5/1955 | |
| GB | 918474 | A | * | 2/1963 | |
| GB | 2121759 | A | * | 1/1984 | B66F 9/122 |
| WO | WO-2011059297 | A2 | * | 5/2011 | B62B 1/14 |
| WO | WO-2026005596 | A1 | * | 1/2026 | B62B 3/0612 |

* cited by examiner

PALLET JACK WITH LATERALLY SPREADING AND TELESCOPICALLY EXTENDING PRONGS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pallet jack and more particularly pertains to a new pallet jack for adapting to different pallets by adjusting lateral placement and length of the pallet jack's prong.

(2) Description of Related Art Including Information Disclosed Under 37 CFR 1.97 and 1.98

The prior art relates to pallet jacks with prongs that adjust to accommodate different pallets. U.S. Pat. No. 7,641,011 discloses a pallet jack with prongs that are movable toward and away from each other to adjust a distance between the prongs. Other pallet jacks are disclosed which have prongs that fold for storage and those which telescopically extend and retract to carry longer loads. However, the prior art fails to describe a pallet jack with mechanisms for both adjusting a distance between the pallet jack's prongs and for adjusting the lengths of the prongs. Because of the lifting mechanism typically found on pallet jacks, the combination of such mechanisms into one pallet jack requires additional steps to achieve such an apparatus while maintaining a capability to selectively lift the frame and prongs of the pallet jack.

BRIEF SUMMARY OF THE INVENTION

An embodiment of the disclosure meets the needs presented above by generally comprising a frame and a steer wheel rotatably coupled to the frame. A frame jack is mounted between the steer wheel and the frame, and the frame jack is alternately extendable and retractable to raise and lower the frame respectively relative to the steer wheel. A pair of prongs is mounted to the frame. Each prong is elongated and extends forwardly from the frame. The prongs lie parallel to each other and are spaced laterally from each other with respect to the frame. Each prong is slidable laterally with respect to the frame and is alternately telescopically extendable away from and retractable toward the frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
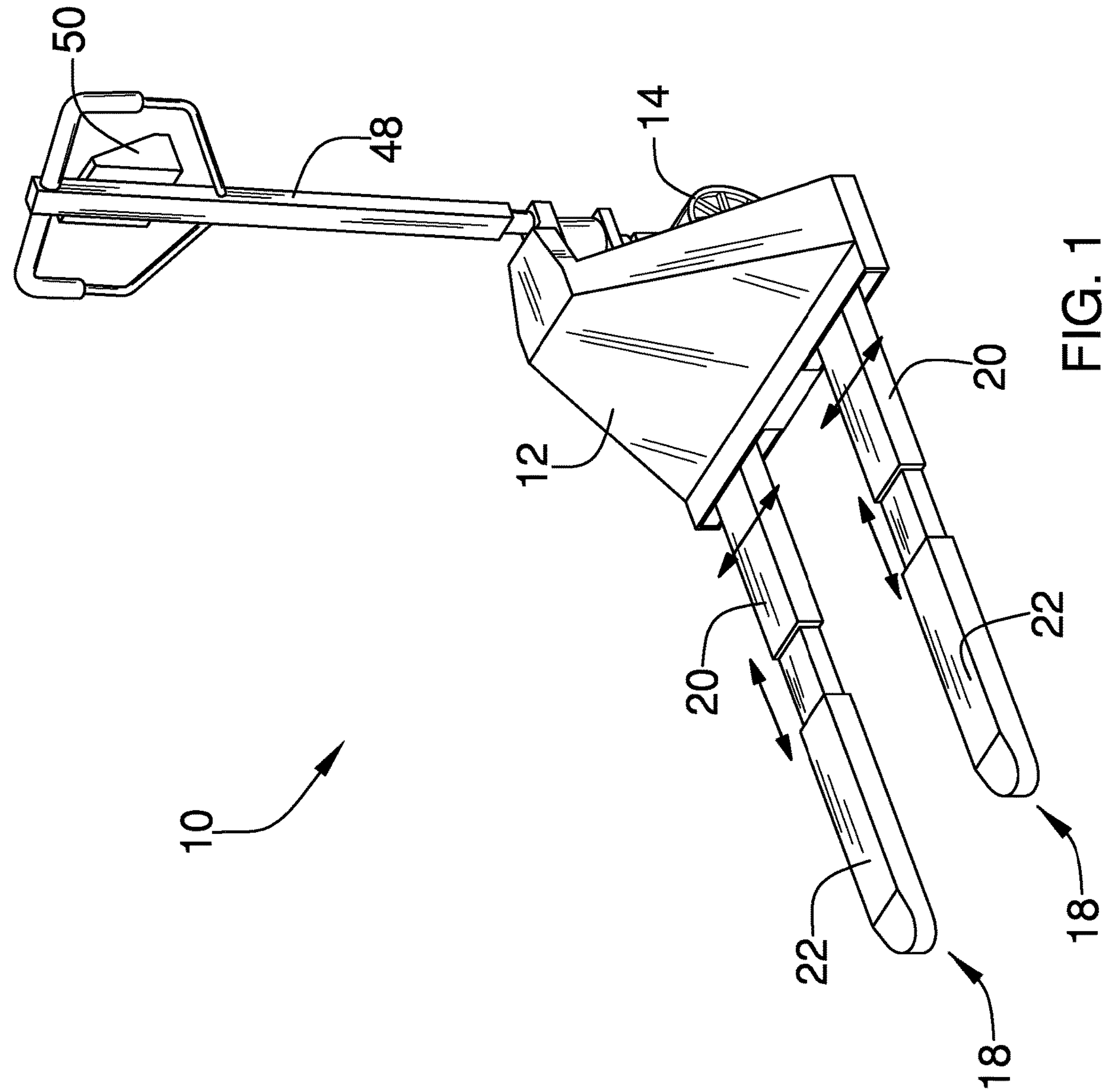
FIG. 1 is a front perspective view of a pallet jack according to an embodiment of the disclosure.
Figure 2:
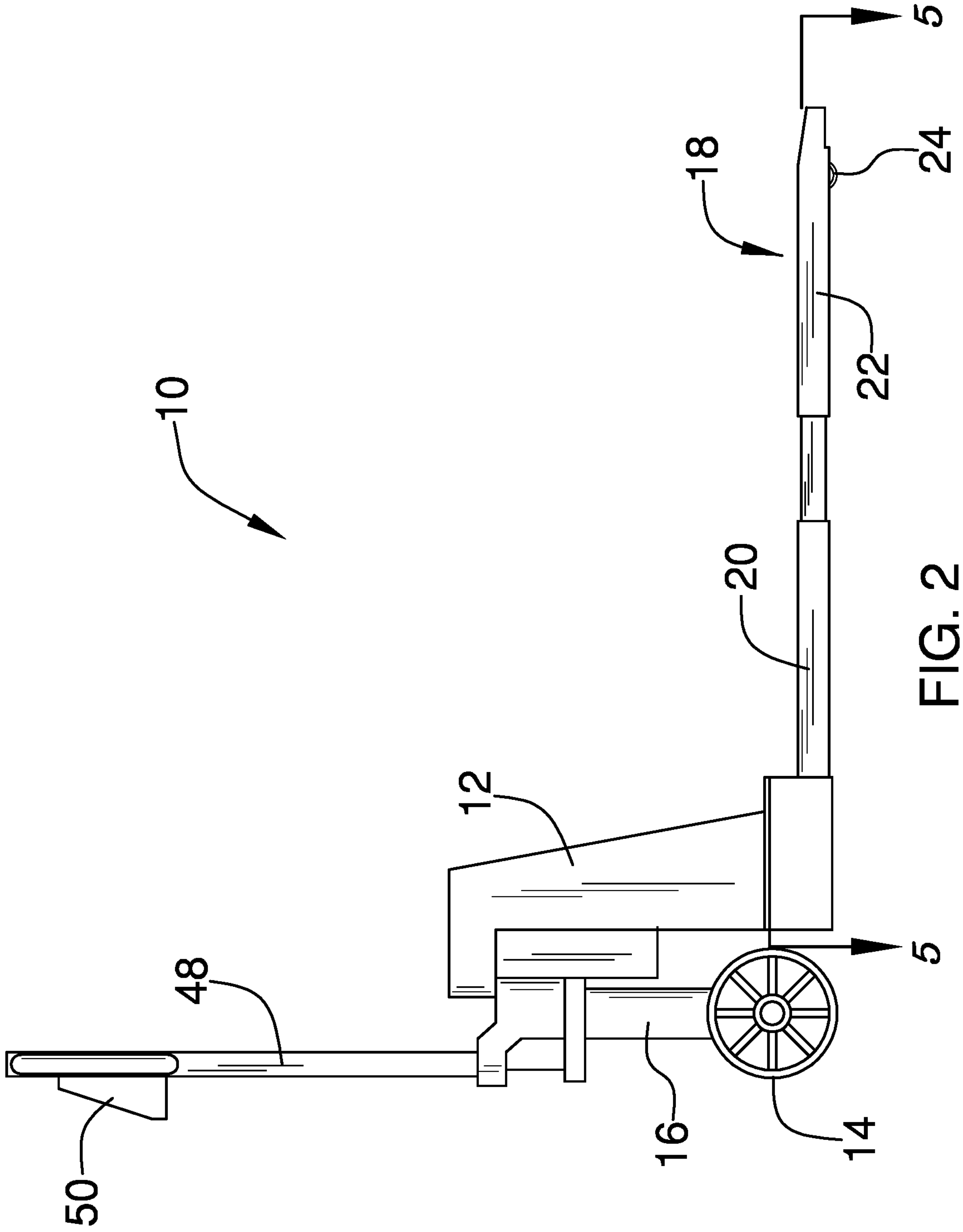
FIG. 2 is a side view of an embodiment of the disclosure.
Figure 3:
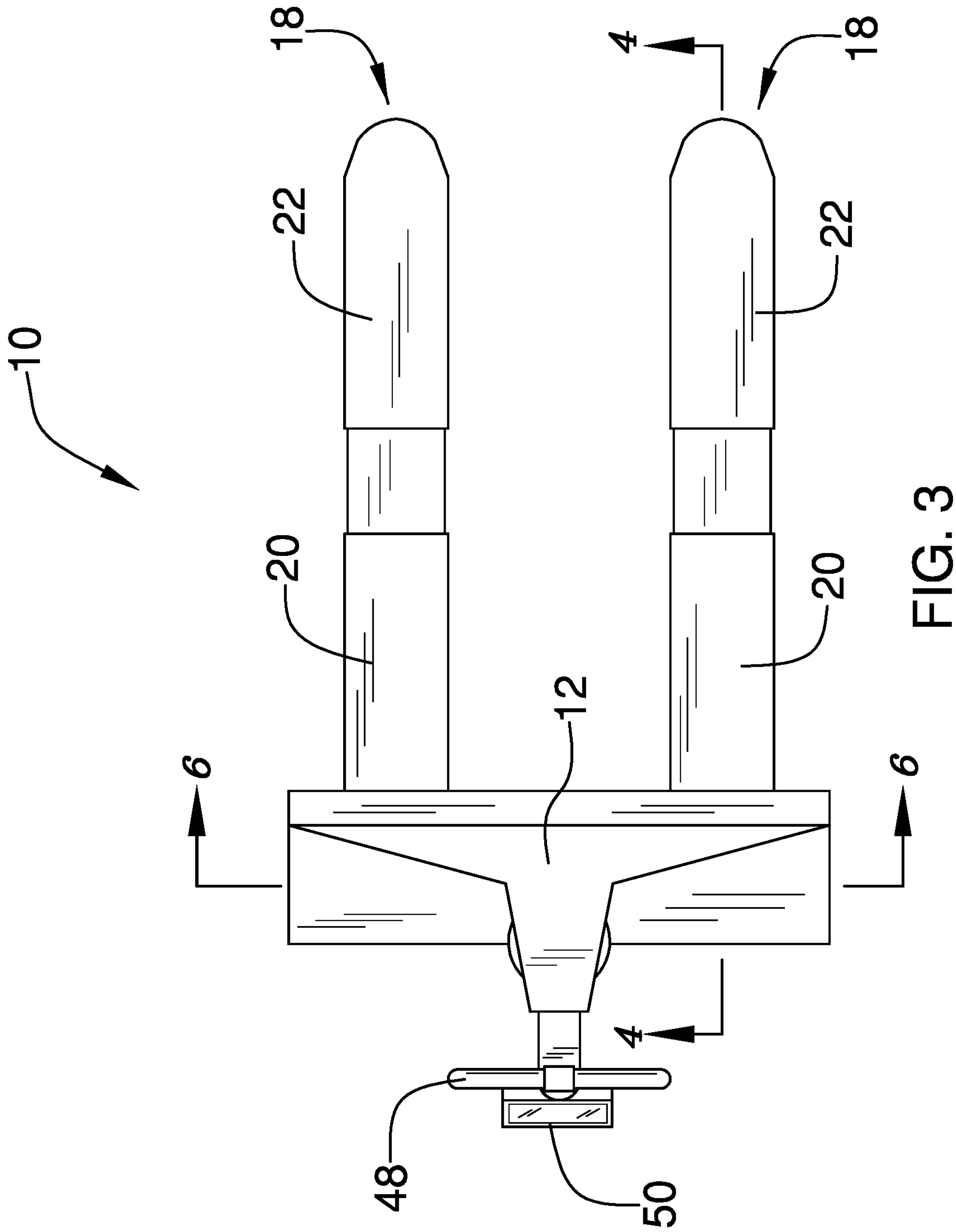
FIG. 3 is a top view of an embodiment of the disclosure.
Figure 4:
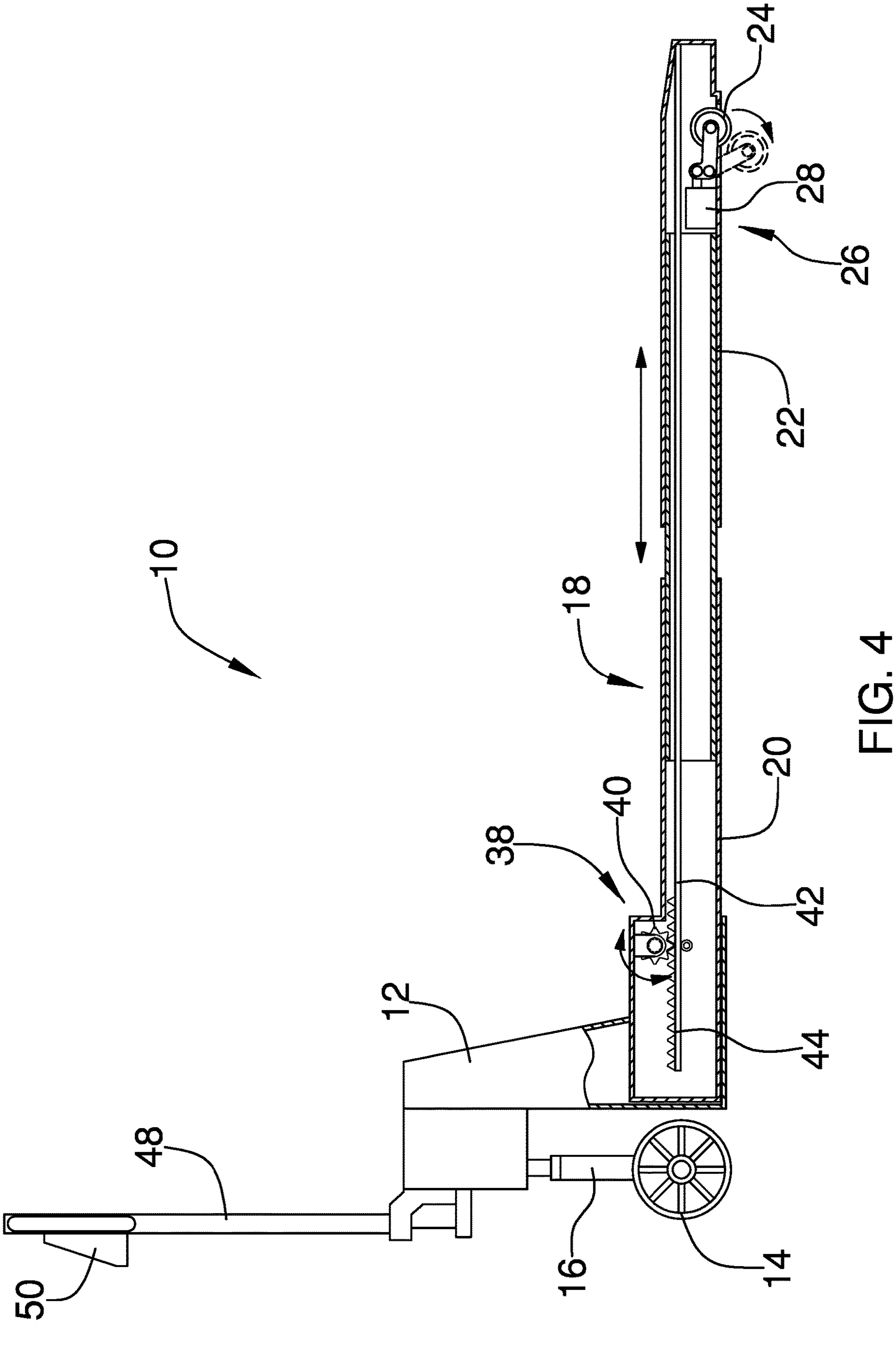
FIG. 4 is a cross-section view of an embodiment of the disclosure taken from Line 4-4 in FIG. 3.
Figure 5:
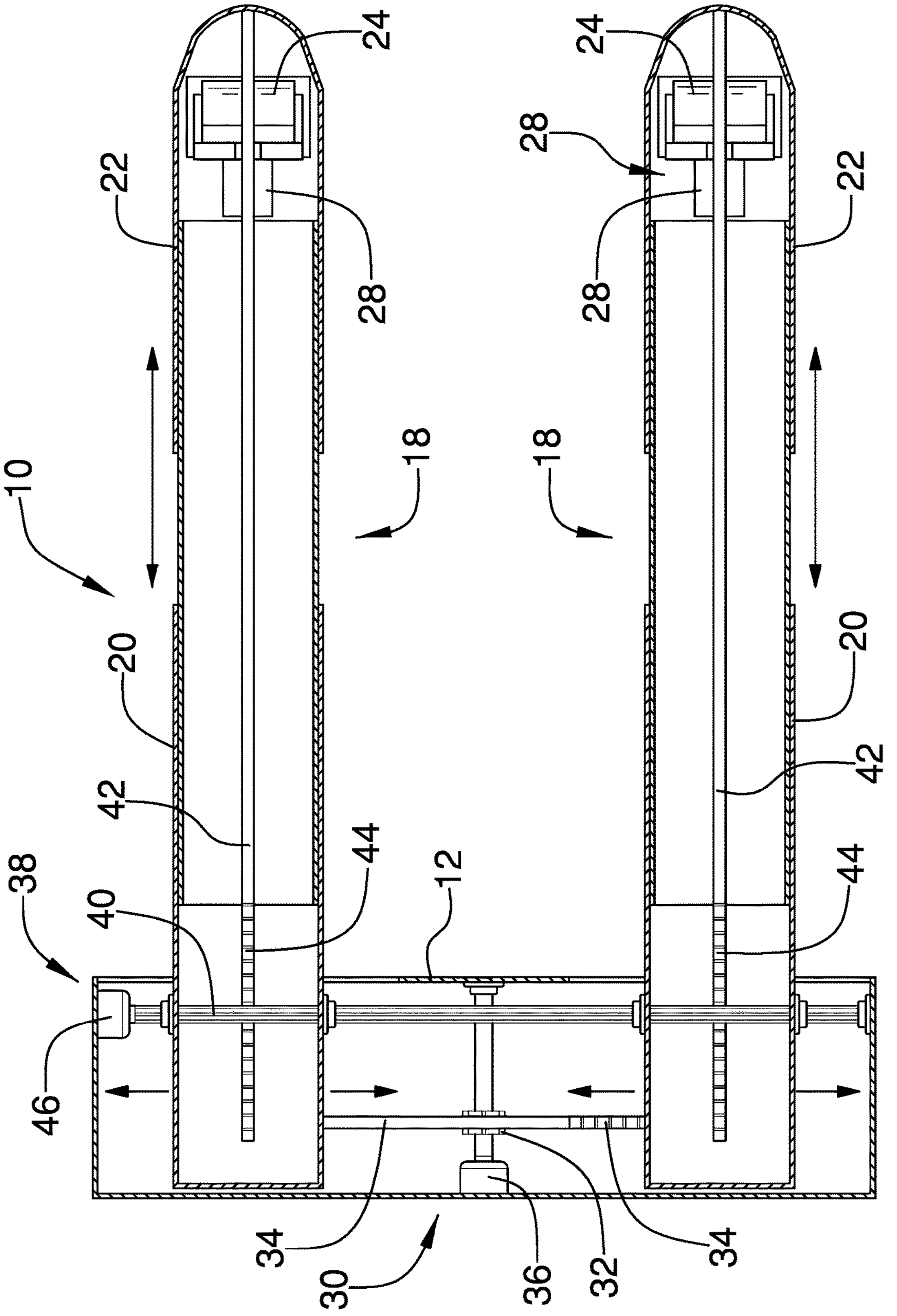
FIG. 5 is a cross-section view of an embodiment of the disclosure taken from Line 5-5 in FIG. 2.
Figure 6:
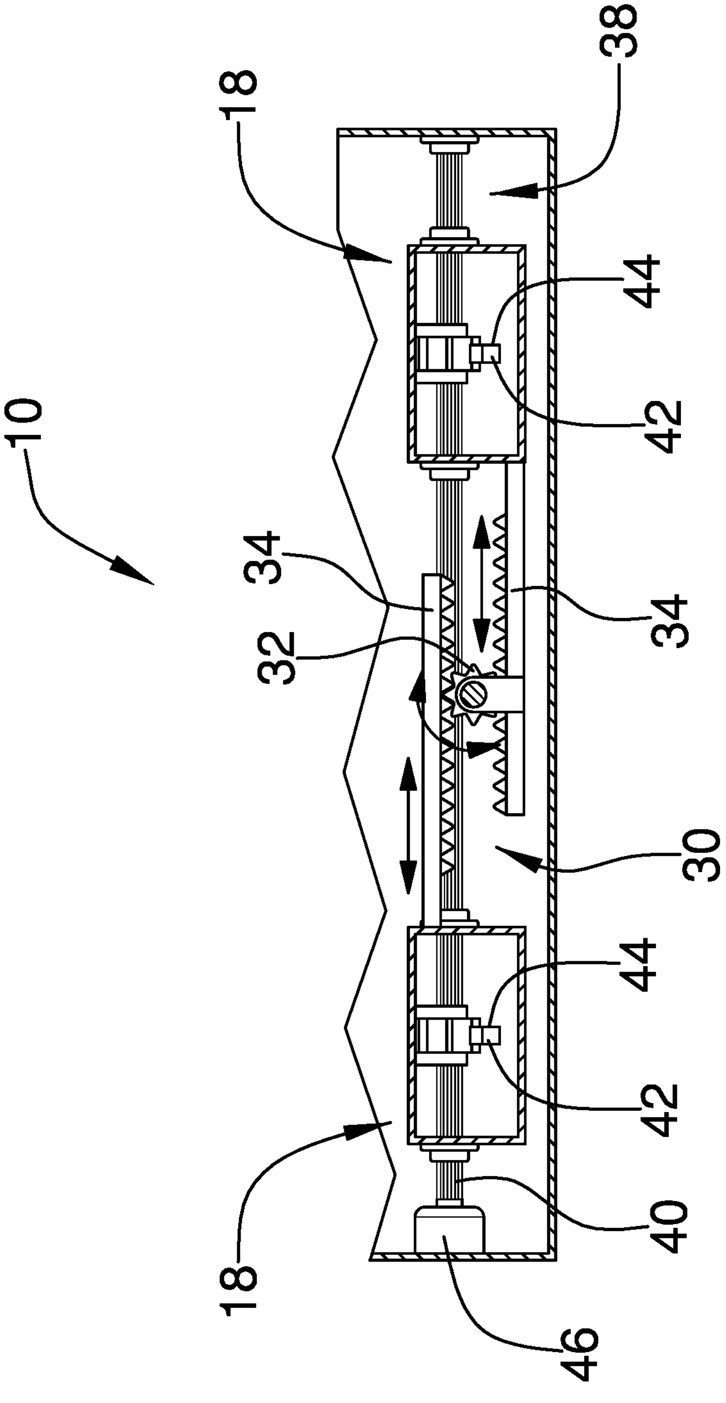
FIG. 6 is a cross-section view of an embodiment of the disclosure taken from Line 6-6 in FIG. 3.
Figure 7:
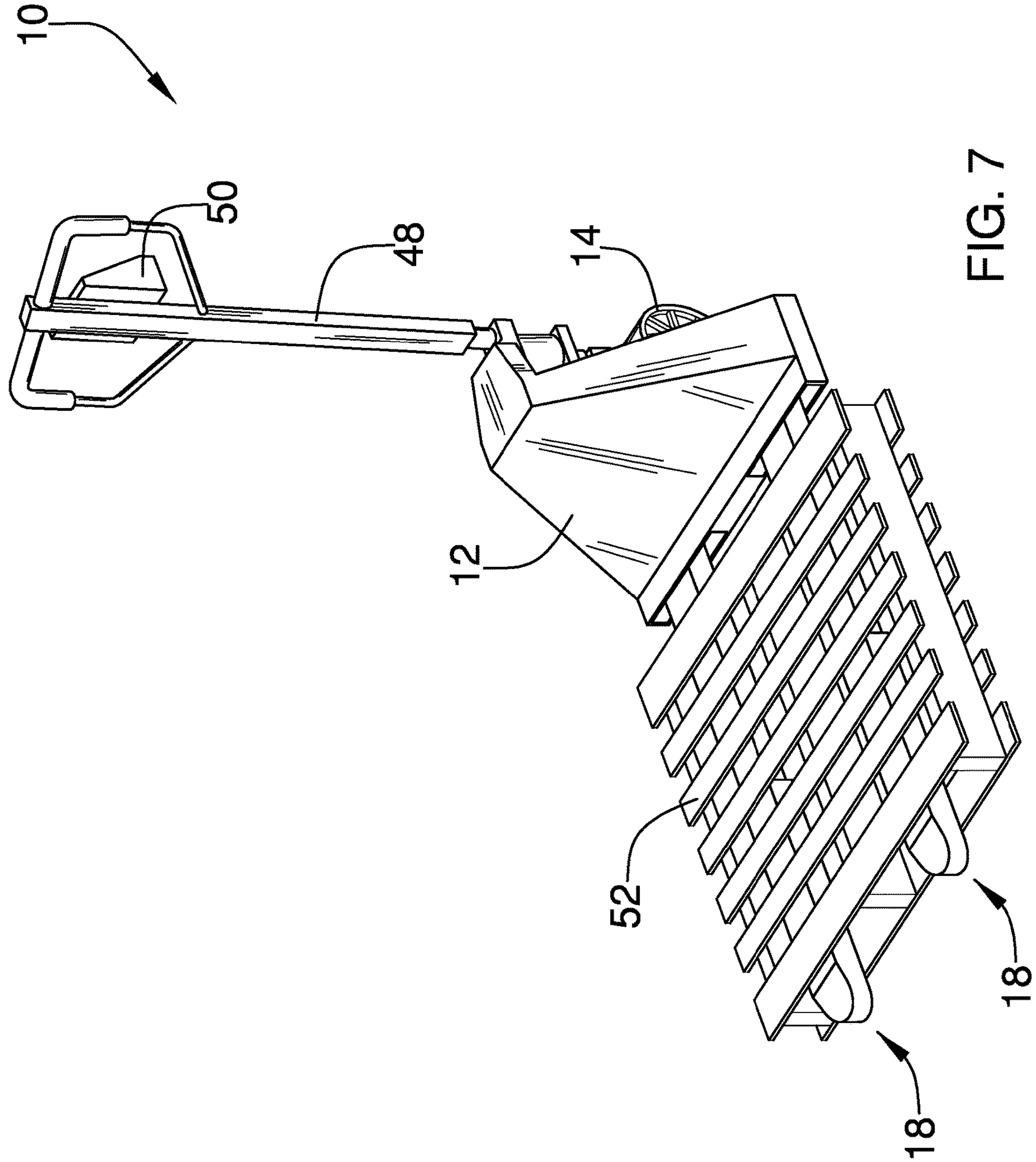
FIG. 7 is an in-use view of an embodiment of the disclosure.
Figure 8:
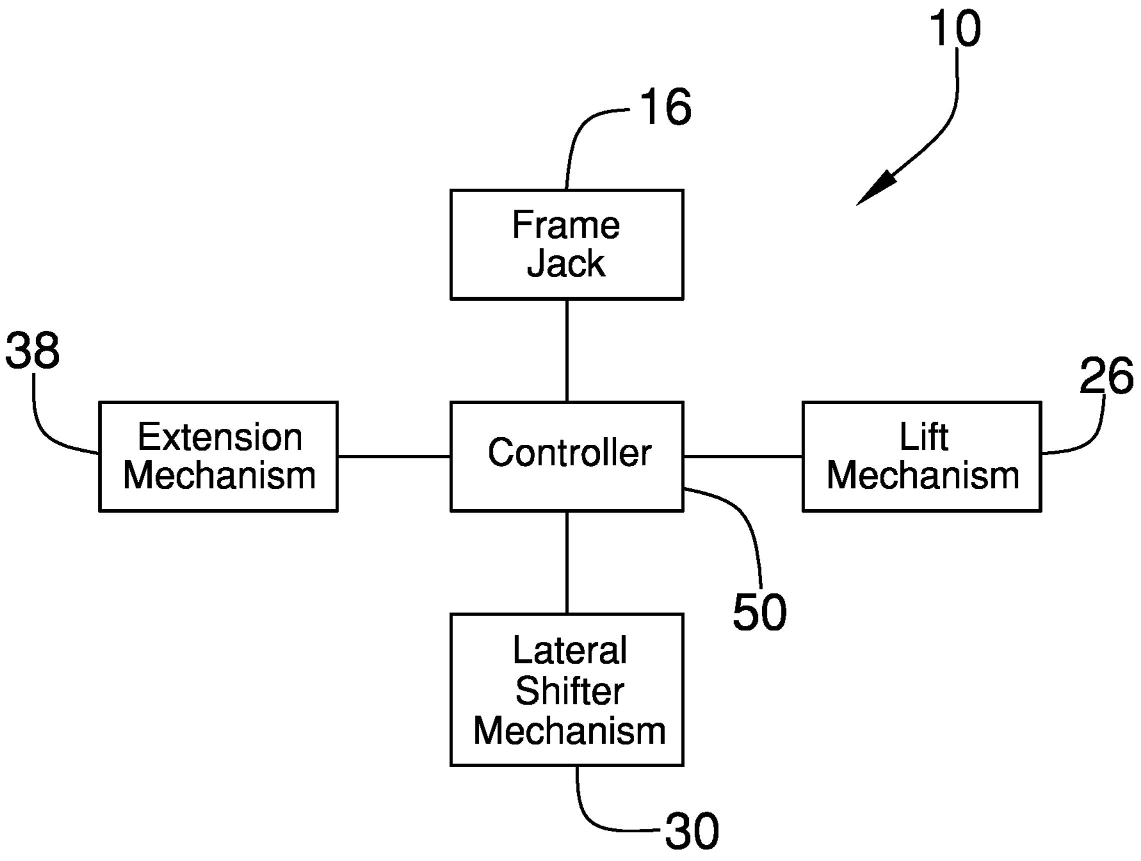
FIG. 8 is a block diagram of an embodiment of the disclosure.

With reference now to the drawings, and in particular to FIGS. 1 through 8 thereof, a new pallet jack embodying the principles and concepts of an embodiment of the disclosure and generally designated by the reference numeral 10 will be described.

As best illustrated in FIGS. 1 through 8, the pallet jack 10 generally comprises a frame 12 and a steer wheel 14 rotatably coupled to the frame 12. The steer wheel 14 is pivotable about a vertical axis with respect to the frame 12 during normal use. A frame jack 16 is mounted between the steer wheel 14 and the frame 12. The frame jack 16 is alternately extendable and retractable to raise and lower the frame 12 respectively relative to the steer wheel 14.

A pair of prongs 18 is mounted to the frame 12. Each prong 18 is elongated and extends forwardly from the frame 12. The prongs 18 lie parallel to each other and are spaced laterally from each other with respect to the frame 12. Each prong 18 is slidable laterally with respect to the frame 12, and each prong 18 is alternately telescopically extendable away from and retractable toward the frame 12. A pair of rollers 24 is provided. Each roller 24 is mounted in an associated prong 18 of the pair of prongs 18 and is positioned distally from the frame 12. Each roller 24 is pivotable downwardly with respect to the associated prong 18 in order to lift the associated prong 18 above a floor surface. A lifter mechanism 26 is configured to selectively push the pair of rollers 24 downwardly to engage the floor surface. The lifter mechanism 26 comprises a pair of roller jacks 28, each of which is operatively coupled to an associated roller 24 of the pair of rollers 24.

A lateral shifter mechanism 30 is operable to move the pair of prongs 18 alternately away from and toward each other. The lateral shifter mechanism 30 comprises a pinion 32, a pair of prong-spreading racks 34, and a spreader motor 36. The pinion 32 is rotatably mounted in the frame 12 and has an axis which lies parallel to each prong 18. The pinion 32 is also positioned between the pair of prongs 18. Each prong-spreading rack 34 meshes with the pinion 32 and is coupled to an associated prong 18 of the pair of prongs 18. The prong-spreading racks 34 are positioned on opposite sides of the pinion 32 such that the pinion 32 is rotatable in a first rotational direction to spread the prongs 18 away from each other and is rotatable in a second rotational direction to urge the prongs 18 toward each other. The spreader motor 36 is mounted in the frame 12 and operatively coupled to the pinion 32.

An extension mechanism 38 is operable to alternately lengthen and shorten the prongs 18. The extension mechanism 38 comprises a splined shaft 40, a pair of rods 42, and an extension motor 46. The splined shaft 40 is rotatably mounted to and extends laterally with respect to the frame 12. The splined shaft 40 extends through openings of each prong 18 of the pair of prongs 18 and may rotate freely within the openings. When the prongs 18 slide laterally with respect to the frame 12, they slide along the splined shaft 40. Each rod 42 is mounted to a distal member 22 of an associated prong 18 of the pair of prongs 18. Each rod 42 also has a rack portion 44 which meshes with the splined shaft 40. When the splined shaft 40 rotates in a first rotational direction, it urges the pair of rods 42 forwardly from the frame 12, which urges the distal members 22 of the prongs 18 forward, extending the prongs 18 telescopically. When the splined shaft 40 rotates in a second rotational direction, it urges the pair of rods 42 rearwardly toward the frame 12, thereby retracting the prongs 18 telescopically. The extension motor 46 is mounted in the frame 12 and operatively coupled to the splined shaft 40.

A handle 48 is coupled to and extends upwardly from the frame 12. A controller 50 is mounted to the handle 48 and is operatively coupled to the frame jack 16, the lifter mechanism 26, the lateral shifter mechanism 30, and the extension mechanism 38. The controller 50 comprises processing circuitry for operating the frame jack 16, the lifter mechanism 26, the lateral shifter mechanism 30, and the extension mechanism 38. In other embodiments, the controller 50 may be remote from these components, acting via transceivers or the like to perform operations. A battery, capacitor, or other suitable energy storage supplies power for operating the frame jack 16, the lifter mechanism 26, the lateral shifter mechanism 30, and the extension mechanism 38.

In some embodiments, operating the various components may be done mechanically. The lateral shifter mechanism 30 and the extension mechanism 38 may have protrusions which extend out of the frame 12 which are engageable by socket drives or the like to operate each mechanism. The frame jack 16 may be operated in these embodiments via traditional means, which is to say that the handle 48 is used to actuate the frame jack 16, which comprises a hydraulic pump to lift the frame 12.

Some embodiments may also include mechanical means of pivoting the rollers 24. For example, a lever may be pivotally coupled to a base portion of the frame jack 16 and the frame 12, which is then made to pivot upwardly with respect to the frame jack 16 by the frame 12 when the frame jack 16 lifts the frame 12. The lever is also attached to the rollers 24 via connecting rods which extend through each of the prongs 18. Thus, when the lever is made to pivot upwardly with respect to the frame jack 16, it causes the rollers 24 to pivot downwardly and lift the prongs 18. Such a mechanism would require the connecting rods to be slidably coupled to the lever so that, when the prongs 18 move laterally with respect to the frame 12, the connecting rods are also allowed to slide relative to the lever while remaining operatively coupled to the lever. A similar mechanism is depicted in U.S. Pat. No. 7,641,011, which shows a mechanical means of lifting prongs 18 via rollers 24 which are mounted to laterally movable prongs 18. To adapt such a mechanism to the telescopically extendable prongs 18 of the present disclosure, the rollers 24 may be pivotally coupled to proximal members 20 of the prongs 18. As so described, the roller 24 will remain fixed relative to the proximal member 20 of the associated prong 18 when the associated prong 18 extends or retracts telescopically.

In use, the lateral shifter mechanism 30 and the extension mechanism 38 are operated as described above via the controller 50, mechanical means, or any other suitable means to adapt to a pallet 52 to be moved. The prongs 18 are inserted into receiving slots in the pallet 52, and the pallet 52 is lifted by operating the lifter mechanism 26 and the frame jack 16. The pallet 52 is moved as desired by the pallet jack 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pallet jack comprising:

a frame;

a steer wheel rotatably coupled to the frame;

a frame jack mounted between the steer wheel and the frame, the frame jack being alternately extendable and retractable to raise and lower the frame respectively relative to the steer wheel;

a pair of prongs mounted to the frame, each prong being elongated and extending forwardly from the frame, the pair of prongs lying parallel to each other, the pair of prongs being spaced laterally from each other with respect to the frame, each prong being slidable laterally with respect to the frame, each prong being alternately telescopically extendable away from and retractable toward the frame; and an extension mechanism operable to alternately lengthen and shorten the prongs, the extension mechanism comprising a splined shaft rotatably mounted to and extending laterally with respect to the frame, the splined shaft extending through openings of each prong of the pair of prongs, the splined shaft being freely rotatable within the openings of the prongs, the pair of prongs being positioned to slide along the splined shaft when they slide laterally with respect to the frame; and a pair of rods, each rod having a rack portion which meshes with the splined shaft, each rod being mounted to a distal member of an associated prong of the pair of prongs, the splined shaft being rotatable in a first rotational direction to urge the pair of rods forwardly from the frame, the splined shaft being rotatable in a second rotational direction to urge the pair of rods rearwardly relative to the frame.

2. The pallet jack of claim 1, further comprising a lateral shifter mechanism operable to move the pair of prongs alternately away from and toward each other, the lateral shifter mechanism comprising:

a pinion rotatably mounted in the frame, the pinion having an axis which lies parallel to each prong, the pinion being positioned between the pair of prongs;

a pair of prong-spreading racks meshed with the pinion, each prong-spreading rack being coupled to an associated prong of the pair of prongs, the pair of prong-spreading racks being positioned on opposite sides of the pinion, the pinion being rotatable in a first rotational direction to spread the prongs away from each other and being rotatable in a second rotational direction to urge the prongs toward each other.

3. The pallet jack of claim 2, wherein the lateral shifter mechanism further comprises a spreader motor mounted in the frame and operatively coupled to the pinion.

4. The pallet jack of claim 2, wherein the extension mechanism further comprises an extension motor mounted in the frame and operatively coupled to the splined shaft.

5. The pallet jack of claim 1, wherein the extension mechanism further comprises an extension motor mounted in the frame and operatively coupled to the splined shaft.

6. The pallet jack of claim 1, wherein the steer wheel is pivotable about a vertical axis with respect to the frame during normal use.

7. The pallet jack of claim 1, further comprising a pair of rollers, each roller mounted to an associated prong of the pair of prongs, each roller being positioned distally from the frame, each roller being pivotable downwardly with respect to the associated prong.

8. The pallet jack of claim 7, further comprising a lifter mechanism configured to selectively push the pair of rollers downwardly to engage a floor surface and raise the pair of prongs away from the floor surface.

9. The pallet jack of claim 8, wherein the lifter mechanism comprises a pair of roller jacks, each roller jack being operatively coupled to an associated roller of the pair of rollers.

10. The pallet jack of claim 1, further comprising a handle coupled to and extending upwardly from the frame.

11. A pallet jack comprising:

a frame;

a steer wheel rotatably coupled to the frame;

a frame jack mounted between the steer wheel and the frame, the frame jack being alternately extendable and retractable to raise and lower the frame respectively relative to the steer wheel;

a pair of prongs mounted to the frame, each prong being elongated and extending forwardly from the frame, the pair of prongs lying parallel to each other, the pair of prongs being spaced laterally from each other with respect to the frame, each prong being slidable laterally with respect to the frame, each prong being alternately telescopically extendable away from and retractable toward the frame; and a controller operatively coupled to the pair of prongs to selectively move the prongs laterally with respect to the frame, the controller being operable to selectively telescopically extend and retract the pair of prongs, the controller being operable to selectively actuate the frame jack to raise and lower the frame.

12. A pallet jack comprising:

a frame;

a steer wheel rotatably coupled to the frame, the steer wheel being pivotable about a vertical axis with respect to the frame during normal use;

a frame jack mounted between the steer wheel and the frame, the frame jack being alternately extendable and retractable to raise and lower the frame respectively relative to the steer wheel;

a pair of prongs mounted to the frame, each prong being elongated and extending forwardly from the frame, the pair of prongs lying parallel to each other, the pair of prongs being spaced laterally from each other with respect to the frame, each prong being slidable laterally with respect to the frame, each prong being alternately telescopically extendable away from and retractable toward the frame;

a pair of rollers, each roller mounted to an associated prong of the pair of prongs, each roller being positioned distally from the frame, each roller being pivotable downwardly with respect to the associated prong;

a lifter mechanism configured to selectively push the pair of rollers downwardly to engage a floor surface and raise the pair of prongs away from the floor surface, the lifter mechanism comprising a pair of roller jacks, each roller jack being operatively coupled to an associated roller of the pair of rollers;

a lateral shifter mechanism operable to move the pair of prongs alternately away from and toward each other, the lateral shifter mechanism comprising:

a pinion rotatably mounted in the frame, the pinion having an axis which lies parallel to each prong, the pinion being positioned between the pair of prongs;

a pair of prong-spreading racks meshed with the pinion, each prong-spreading rack being coupled to an associated prong of the pair of prongs, the pair of prong-spreading racks being positioned on opposite sides of the pinion, the pinion being rotatable in a first rotational direction to spread the prongs away from each other and being rotatable in a second rotational direction to urge the prongs toward each other; and a spreader motor mounted in the frame and operatively coupled to the pinion;

an extension mechanism operable to alternately lengthen and shorten the prongs, the extension mechanism comprising:

a splined shaft rotatably mounted to and extending laterally with respect to the frame, the splined shaft extending through openings of each prong of the pair of prongs, the splined shaft being freely rotatable within the openings of the prongs, the pair of prongs being positioned to slide along the splined shaft when they slide laterally with respect to the frame;

a pair of rods, each rod having a rack portion which meshes with the splined shaft, each rod being mounted to a distal member of an associated prong of the pair of prongs, the splined shaft being rotatable in a first rotational direction to urge the pair of rods forwardly from the frame, the splined shaft being rotatable in a second rotational direction to urge the pair of rods rearwardly relative to the frame; and an extension motor mounted in the frame and operatively coupled to the splined shaft;

a handle coupled to and extending upwardly from the frame; and a controller operatively coupled to the frame jack, the lifter mechanism, the lateral shifter mechanism, and the extension mechanism, the controller being mounted on the handle.

* * * * *